United States Patent [19]

Akao

[11] Patent Number: 4,663,218

[45] Date of Patent: May 5, 1987

[54] PACKAGING FILM FOR PHOTOSENSITIVE MATERIALS FOR PHOTOGRAPHIC PURPOSE

[75] Inventor: Mutsuo Akao, Kanagawa, Japan

[73] Assignee: Fuji Photo Film Co., Ltd., Kanagawa, Japan

[21] Appl. No.: 769,573

[22] Filed: Aug. 26, 1985

[30] Foreign Application Priority Data

Aug. 27, 1984 [JP] Japan ............... 59-17804

[51] Int. Cl.$^4$ ............... B32B 7/02; B32B 15/08
[52] U.S. Cl. ............... 428/212; 428/35; 428/213; 428/218; 428/461; 428/523; 430/524; 430/526; 430/961
[58] Field of Search ............... 428/35, 461, 523, 516, 428/218, 212, 213; 430/505, 523, 961, 524, 526; 525/74

[56] References Cited

U.S. PATENT DOCUMENTS

| | | | |
|---|---|---|---|
| 2,681,294 | 6/1954 | Beguin | 430/523 |
| 2,715,075 | 8/1955 | Wolinski | 428/516 |
| 2,761,791 | 9/1956 | Russell | 430/502 |
| 2,941,898 | 6/1960 | Wynn | 430/523 |
| 3,549,406 | 12/1970 | Ambush | 430/505 |
| 4,258,848 | 3/1981 | Akao et al. | 428/461 X |
| 4,438,238 | 3/1984 | Fukushima et al. | 428/218 X |
| 4,472,555 | 9/1984 | Schmukler et al. | 525/74 |
| 4,477,532 | 10/1984 | Schmukler et al. | 428/461 X |
| 4,551,367 | 11/1985 | Nagatani et al. | 428/35 |

*Primary Examiner*—Thomas J. Herbert
*Attorney, Agent, or Firm*—Burgess, Ryan & Wayne

[57] ABSTRACT

A packaging film for photosensitive materials for photographic purposes which is a laminated film containing at least a metallized film layer and two polyethylene polymer layers which are located on both sides of the metallized film layer, at least one of the above polyethylene polymer layers contains more than 50 wt % of linear low density polyethylene manufactured by a low pressure method, and side or both of the above polyethylene polymer layers contains 0.3 to 30 wt % of a light-shielding material, and the strength of one or both sides of the above polyethylene polymer layers is stronger than the adhesive force between the above metallized film and the difference in the thickness of the polyethylene polymer layers is smaller than 50%.

This film is superior in physical strength, moisture proofing, gas barrier, light-shielding and antistatic character, and it is superior as a packaging film for a photosensitive material for photographic purpose.

9 Claims, 16 Drawing Figures

FIG. 8
COMPARATIVE EXAMPLE

FIG. 9
COMPARATIVE EXAMPLE

FIG. 10
COMPARATIVE
EXAMPLE

FIG. 11
COMPARATIVE
EXAMPLE

PACKAGING FILM FOR PHOTOSENSITIVE MATERIALS FOR PHOTOGRAPHIC PURPOSE

BACKGROUND OF THE INVENTION

1. Field of the Invention

This invention relates to a polyethylene film for packaging photosensitive materials for photographic purposes, particularly a laminated film containing a layer of linear low density polyethylene resin manufactured by a low pressure method.

2. Description of Prior Arts

Polyethylene film is widely employed as a packaging material. Most of the polyethylene films are made of low density polyethylene manufactured by a high pressure method or high density polyethylene manufactured by a low pressure method. Recently, linear low density polyethylene manufactured by low pressure methods (L-LDPE) has been developed. This L-LDPE has both advantages of the polyethylene of the high pressure method and the polyethylene of the low pressure method, and it is noticed because of its low cost and high strength which are in accord with current requirements, i.e. to save energy and to save resources. However, since transparency of L-LDPE is insufficient, it is difficult to replace the low density polyethylene for the use in general packaging by the L-LDPE. Moreover, since processing character of the L-LDPE are inferior, it is also difficult to replace in the field where transparency is not required.

As the packaging materials for photosensitive materials for photographic purposes, it is necessary that they possess various properties such as light-shielding, gas barrier, moisture proofing, physical strengths such as breaking strength, tear strength, impact puncture strength and Gelbo test strength, heat sealing properties such as heat seal strength and hot tack properties (hot-seal ability) and antistatic properties and the like. Generally, it is difficult to satisfy these properties by a single layer film, and accordingly, a laminated film is usually employed. Such a laminated film is, for example, composed of a low density polyethylene film containing carbon black or a pigment and a flexible sheet such as paper, aluminum foil or cellophane.

Figure 13:
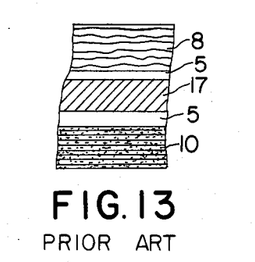

An example of conventional films is shown in FIG. 13. This film is a laminated film composed of a film of a low density polyethylene manufactured by a high pressure method containing carbon black, an aluminum foil and a flexible sheet.

On the other hand, the present inventor has already developed a film for packaging photosensitive materials for photographic purpose using L-LDPE (Japanese Patent Application Kokai No. 58-132555). This film is characterized by containing at least one layer of polyethylene polymer of which more than 50 wt% is L-LDPE and which contains more than 1 wt% of a light-shielding material.

Physical properties of the conventional laminated films are not enough, and during packaging, the films were sometimes torn, punctured or the heat seal of the films sometimes separated. In addition, when a large amount of a light-shielding material such as carbon black is added, physical strength of the film is lowered. Then, the amount was set about 3%, and thickness of the film was more than 70 μm. As the result, the film was stiff, and working efficiency of the packaging process was badly influenced. Cost of the packaging was also expensive.

In the case of the film using L-LDPE described previously, physical strength was improved. However, when aluminum foil was laminated in order to impart gas barrier, to raise moisture proofing, to impart antistatic properties, etc., tear strength of the film fell less than one half in spite of the increased thickness.

SUMMARY OF THE INVENTION

It is an object of the invention to provide a film for packaging a photosensitive material which is superior in physical strength such as tear strength, impact puncture strength and Gelbo test strength and of which gas barrier, moisture proofing and antistatic properties are improved.

In brief, the film of the invention is a laminated film containing at least a metallized film layer and two polyethylene polymer layers which are located on both sides of the metallized film layer, (a) at least one of the above polyethylene polymer layers contains more than 50 wt% of L-LDPE, (b) one or both of the above polyethylene polymer layers contains 0.3 to 30 wt% of a light-shielding material, and (c) strength of at least one of the polyethylene polymer layers is stronger than the adhesive force between the metallized film and the difference in the thickness of two polyethylene polymer layers is less than 50%.

DETAILED DESCRIPTION OF THE INVENTION

The metallized film is a thermoplastic resin film the surface being coated with a metal membrane layer preferably by vacuum evaporation.

The thermoplastic resin includes polypropylene (PP), high density polyethylene manufactured by low pressure method (HDPE), medium density polyethylene manufactured by low pressure method (MDPE), low density polyethylene manufactured by high pressure method (LDPE), L-LDPE and a polyamide. Preferably, the molecular orientation degree or degree of stretching is less than 3 times, and preferably, the blow-up ratio is less than 3. For example, biaxially stretched Nylon film and non oriented PP film is particularly preferable. Thickness of the film is usually 5 to 50 μm, preferably 8 to 35 μm.

The metal membrane layer may be formed of a pure metal such as Al, Sn, Zn, Co, Cr, Ni, Fe, Cu, etc. alloys thereof, or any other metals of which a metal membrane layer can be made, but aluminum is the most preferable in terms of processing and cost.

Thickness of the metalic membrane layer to be metallized is 55–1200 Å, preferably 80–800 Å. 100–600 Å is most preferable. When the thickness is less than 55 Å, antistatic properties of the film are insufficient. Moreover, in order to secure moisture proofing and light-shielding, the thickness of other layers such as the polyethylene polymer layer, a heat-resistant sheet layer and a heat sealing layer (the heat sealing layer endowed with light-shielding is preferable) must be increased. On the other hand, when the thickness is greater than 1200 Å, degradation of the thermoplastic resin film occurs by the heat of metallizing, and strength of the laminated film produced falls.

The metallic membrane layers are preferably provided on both faces of the thermoplastic resin film.

When it is provided to one face, the face is preferably the face nearer to the inner side of a package.

Metallization is carried out according to a known method, such as vacuum evaporation or ion plating. Heating of the metal to be metallized is also carried out according to a known method, such as heating by electric resistance, electron beam heating or high-frequency heating.

Prior to the metallization, the face of the thermoplastic resin film is preferably activated by a known method. Such a surface activation includes anchor coating, etching by an acid, flame treatment, corona treatment and glow discharge treatment. The corona treatment described in U.S. Pat. Nos. 2,715,075, 2,846,727, 3,549,406, 3,590,107, etc. is preferably employed because of its simplicity and low cost.

A protection layer may be provided on the metallic membrane, if necessary. As the protection layer, acrylic resin, a cellulose resin such as cellulose acetate, polyurethane, epoxy resin, polyester, an ionomer resin, EEA resin, various polyethylenes or polypropylenes are employed. In addition, a wax, gelatin or polyvinyl alcohol can also be employed. Thickness of the protection layer is made extremely thin such as thinner than 50 $\mu$m preferably thinner than 5 $\mu$m in order to eliminate static electricity effectively. Such a protection layer may be formed by a known solution coating or spray coating. An antistatic agent may be added to an adhesive layer for a flexible sheet, a heat sealing layer or the protection layer, and thereby elimination of static electricity is ensured.

Prior to the coating of the protection layer, the face of metallic membrane is preferably activated. This treatment may be selected from the foregoing methods as to the thermoplastic resin film.

An adhesive layer may be provided between the metallized film layer and the polyethylene polymer layer. The adhesive is selected by considering both layers to be joined, and includes a thermoplastic resin melting adhesive including a polyolefin adhesive, a melting type gum adhesive and a solvent type gum adhesive. The polyolefin adhesive includes a homopolymer and a copolymer of an olefin such as various polyethylenes, polypropylenes, polybutenes and ethylene-propylene copolymers and L-LDPE, a copolymer of an olefin and another monomer such as ethylene-vinyl acetate copolymer, ethylene-acrylate ester copolymer, various ionomers ("SURLYN" Dupont, "ADMER" Mitsui Polychemicals Co., Ltd., etc.) and a graft copolymer.

The method of providing the adhesive layer is not limited. For example, the extrusion laminating method is preferable in terms of cost, and the dry laminating method is preferable because cracks rarely occur in the metallic membrane. A solution coating is commonly employed. Representative methods of this solution coating embrace dip coating, spray coating, air knife coating, curtain coating, roller coating, doctor knife coating, wire bar coating, slide coating, gravure coating and extrusion coating with a hopper as described in U.S. Pat. No. 2,681,294. The adhesive layer may be two or more layers. In this case, the adhesives may be applied by the method described in U.S. Pat. Nos. 2,761,791, 2,941,898, 3,508,947 and "Koteingu Kogaku" page 253 (Author: Shinji Harazaki, published by Asakura-Shoten in 1973).

Prior to the application of adhesive agent, the surface is preferably activated. This treatment may be selected from the foregoing methods as to the thermoplastic resin film.

The polyethylene polymer layers are provided on both sides of the metallized film layer. At least one of the polyethylene polymer layers contains L-LDPE.

L-LDPE is a copolymer of ethylene and $\alpha$-olefin, and it has a linear structure having short branches. Carbon number of the $\alpha$-olefin is 3–13, preferably 4–10, and examples are butene-1, 4-methylpentene-1, hexene-1 and octene-1. Preferable $\alpha$-olefins are 4-methylpentene-1 and hexene-1. Suitable ethylene content of L-LDPE is 80–99.5 mol.%, i.e. $\alpha$-olefin content is 0.5–20 mol.%, and preferable ethylene content is 90–99.5 mol.%, i.e. $\alpha$-olefin content is 0.5–10 mol.%. Suitable density is in the range of 0.91–0.95 g/cm$^3$, preferably 0.91–0.935 g/cm$^3$. Melt index (M.I., at 190° C.) is usually 0.2–40, preferably 0.4–15. Such a L-LDPE is manufactured by low pressure method. Examples of L-LDPE are "UNIPOLE" (trade name, UCC), "DOWLEX" (trade name, Dow Chemical Co., Ltd.), "STAMILEX" (trade name, DSM), "SUCLEAR" (trade name, Dupont de Nemour, Canada), "MARLEX" (trade name, Phillips Co., Ltd.), "ULTZEX" trade name, Mitsui Petroleum Chemical Industries Co., Ltd.), "NISSEKI LINIREX" (trade name, Nippon Petrochemicals Co., Ltd.).

At least, one side of the polyethylene polymer layers should contain more than 50 wt% of L-LDPE in terms of heat sealing, strength, rigidity and slipping character. Preferable content of L-LDPE is in the range of 60–97 wt%. It is preferable that L-LDPE contents of both polyethylene polymer layers are more than 50 wt%.

In order to improve various properties, a thermoplastic resin may be blended. Such resins include polyethylenes such as LDPE, MDPE and HDPE, polypropylenes (PP), polybutene, polyisobutene, ethylene copolymers such as ethylene-ethyl acrylate copolymer (EEA) and ethylene-vinyl acetate copolymer (EVA), ionomer resins and polystyrene. One or more kinds of resin can be blended. In order to improve physical properties, polyolefin resins such as LDPE, MDPE, HDPE, PP, polybutene, EEA, EVA, ionomer resins are effective. Among them, LDPE is particularly preferable since it improves processing character of the polyethylene polymer layer. Suitable content of LDPE is about 15 wt%.

At least, one polyethylene polymer layer contains a light-shielding material in addition to L-LDPE.

The light-shielding material is powder or particles, and it is able to shield visible and ultraviolet lights. Examples of the light-shielding material are various inorganic or organic pigments, such as various carbon blacks, an iron oxide, zinc white, a titanium oxide, clay, aluminum powder, aluminum paste, calcium carbonate, mica, barium sulfate, talc, cadmium pigments, chrome yellow, red iron oxide, cobalt blue, copper-phthalocyanine pigments, monoazo and polyazo pigments and aniline black. Various carbon blacks and aluminum paste from which volatile components are removed are preferable.

Carbon blacks which represent light-shielding materials for the film of the invention are divided into channel black, gas furnace black, thermal black, etc. according to their manufacturing process. They are also divided into gas black, oil furnace black, anthracene black, acetylene black, lamp black, vegetable black and animal black according to their origin. Among these, oil furnace black, particularly of which particle sizes of more than 50% are smaller than 30 m$\mu$ and of which pH is in the range of 5–9, is the most preferable in terms of light-shielding character, cost and improvement of properties. On the other hand, since acetylene black and Ketschen carbon black have antistatic character, they may be blended to the oil furnace black in order to improve their character.

The form of the light-shielding material prior to blending may be powder, paste, wet state, masterbatch, pellets, etc.

Suitable content of the light-shielding material is different according to its kind. In the case of carbon black, light-shielding effect appears at 0.3 wt%, clearly appears at 1 wt%, and remarkably appears at more than 3 wt%. While, lumps increase with increasing the amount of carbon black. When its content exceeds 30 wt%, the lumps remarkably increases and pinholes also form. Suitable content of carbon black is in the range of 0.3-30 wt%, preferably 1-15 wt%, more preferably 3-10 wt% in points of light-shielding character, formation of lumps, tear strength and cost. Other light-shielding materials have the same tendency.

In the case of a conventional film made of LDPE, physical strength falls with increasing amounts of carbon black as mentioned previously. The inventor experimented the effect of carbon black on L-LDPE. As the result, he has found that physical strength of L-LDPE largely increases by blending carbon black contrary to the case of LDPE. The results are shown in Table 1.

As the method of blending a light-shielding material with the polyethylene polymer containing L-LDPE, the known methods of blending it with LDPE such as the masterbatch method and compound coloring method are utilized. The masterbatch method is preferable in view of cost and clear process. Various masterbatch methods are known, and any known method may be employed. Such a masterbatch method includes the method of dispersing carbon black into a polymer organic solvent solution to produce a masterbatch (Japanese Patent Publication No. 40-26196) and the method of dispersing carbon black into polyethylene to produce a masterbatch (Japanese Patent Publication No. 43-10362).

The masterbatch of L-LDPE is, for example, prepared by the following method. First, a masterbatch of LDPE is prepared by blending more than 2%, usually more than 10% of carbon black with LDPE. Then, L-LDPE is mixed with this masterbatch so that carbon black content becomes a prescribed value. In this method, mixing and dispersing of carbon black is easier than the case of blending carbon black directly with L-LDPE. As a result, fish eye problem is improved and manufacturing cost is lowered. In addition, though the polyethylene polymer layer produced by this method always contain LDPE, processing character of the mixed polymer of L-LDPE and LDPE is superior to that of L-LDPE alone. The resin for masterbatch is not limited to LDPE. As this resin, a polyolefin resin of which MI is higher than L-LDPE is preferable because of homogeneous blending. L-LDPE may also be employed as the resin for masterbatch in order to save cost. Other light-shielding materials may also be blended in the similar manner.

Melt tension and fluidity of L-LDPE are large problems in molding, and the energy necessary to produce film is larger than that of a conventional polyethylene. Modification or exchange of inflation molding machine is sometimes required. For that purpose, a modification of screw structure has been proposed (Japanese Patent Application Kokai No. 55-117638). However, according to this masterbatch method, such modification is not necessary in the case of containing more than 5% of LDPE, and T die and inflation molding machine can be used as it is.

The polyethylene polymer layer may contain known additives, such as a heat stabilizer, on ultraviolet light stabilizer, an antistatic agent, a lubricant and a blocking preventing agent, if necessary.

The polyethylene polymer layer containing L-LDPE and a light-shielding material (light-shielding L-LDPE layer) may directly be laminated to the metalic membrane or its protection layer of the metallized film layer, a light-shielding L-LDPE film is prepared, and it may also be laminated through an adhesive layer. In the case of direct laminating, suitable thickness of the polyethylene polymer layer is in the range of 13 to 70 $\mu$m, preferably 20 to 50 $\mu$m. In the case of using the adhesive layer, its suitable thickness is in the range of 20 to 120 $\mu$m, preferably 35 to 90 $\mu$m. The light-shielding L-LDPE layer is superior in heat sealing strength. Thickness of the polyethylene polymer layer without a light-shielding material which contains or does not contain L-LDPE may also be in the same range as above. The difference in the thickness of two polyethylene polymer layers which are located on both sides of the metallized film layer is smaller than 50%, preferably smaller than 30%. This difference is calculated as follows. In the case that thickness of one layer is 40 $\mu$m and thickness of the other layer is 50 $\mu$m, the difference is calculated as 25%.

$$\text{Difference of layer thickness} = \frac{50 - 40}{40} \times 100 = 25\%$$

A layer containing a light-shielding material may be provided on both sides of the metallized film layer. When this light-shielding layer is provided on only one side, this side is preferably the inner side of a package.

The polyethylene polymer layer, irrespective of the presence of L-LDPE, may be unoriented, uniaxially oriented or biaxially oriented. Composition, presence or absence of a light-shielding material and its content, stretching magnification and direction, and etc. of two polyethylene polymer layers may be identical with or different from each other. For example, two uniaxial oriented polyethylene polymer film are laminated to both faces of a metallized film so that their oriented axes are crossed at right angles to each other.

At least, the strength of one polyethylene polymer layer is necessary to be stronger than adhesive force between the metallized film. When the adhesive force is stronger than either of the polyethylene polymer layers, the three layers is made one body, and tear strength extremely falls like the case of using aluminum foil. In the case that thickness of a metalic membrane layer is thickner than 55 Å, adhesive force hardly becomes stronger than the strength of the polyethylene polymer layer, even if an adhesive layer having any strongly adhesive force or any thickness is employed. Accordingly, in this case, strength of the laminated film is twice or more that of the laminated film where the thermoplastic resin film is not metallized.

Water vapor permeability of the laminated film having three layers thus formed is suitably less than 10 g/m$^2$·24 hrs, preferably less than 5 g/m$^2$·24 hrs.

A heat sealing layer of which melting point is lower than that of the light-shielding L-LDPE layer may be laminated to the light-shielding layer.

Otherwise, this light-shielding layer as itself may be utilized as the heat sealing layer. In the case that carbon black is employed as the light-shielding material, when thickness of the light-shielding L-LDPE layer is thinner than that of a conventional light-shielding LDPE layer, a highly strong heat sealing is possible. Generally, it is desirable that a heat sealing layer is endowed with light-shielding character. Particularly, when a heat sealing layer is thick, this endowment is necessary in order to prevent a light at the sealing part. For this purpose, the utilization of the light-shielding L-LDPE layer of which carbon black content is in the range of 1 to 15 wt% as the heat sealing layer is valuable. Since thickness of the light-shielding L-LDPE layer is small, this utilization is useful in points of low rigidity, improvement of the properties for an automatic packaging machine and cost. In addition, when the light-shielding L-LDPE layer is utilized as a heat sealing layer, heat seal strength just after sealing is high, and solidification of sealing part is fast. Consequently, hot tack properties is well, and the sealing part is hardly extended to thin. That is, lowering of the strength, degradation of light-shielding character and generation of pinholes at the sealing part scarcely happen.

As other merits of the light-shielding L-LDPE layer, its surface is strong and scratches are rarely formed. By this property, the trouble of black powder which happens in the field of packaging a photosensitive sheet having a sharp edge may be solved. Such a sheet includes a sheet film, a roll film and a sheet where a polyethylene laminated sheet is used as a support, and they are usually packed with LDPE.

Slipping character of the light-shielding L-LDPE layer is good. By this character, a photosensitive material is easily inserted into its package, and it is rarely to form a scratch against the material to be packed and to break the package to the contrary. In the case of automatic packaging by a machine, this character is important. Slipping angle of surface of the L-LDPE layer may be in the range of 7° to 15°, while the angle of LDPE layer is 18° to 25°.

Other layers may further be laminated to the above three layers. As such a layer, various thermoplastic resin films such as various polyethylenes films, ethylene copolymers films, polypropylenes films, polyvinyl chlorides films, polyvinylidene chlorides films, polyamides films, polycarbonates films, fluorocarbon polymers films, polyesters films and their modified resins films. Various flexible sheets such as cellulose acetate film, cellophane, polyvinyl alcohol film, paper, non-woven fabric, cross laminated airly fabric, foamed polyethylene sheet, foamed polystyrene sheet and foamed polyurethane sheet are also suitable. The layer to be further laminated is not limited to one layer, and two or more layers may be laminated.

These layers may be laminated according to an usual method such as a heat sealing (hot bar sealing, impulse heat sealing, supersonic welding, etc.), the method using an adhesive (wet laminating, dry laminating, hot melt laminating, extrusion laminating, etc.) and co-extrusion method.

By the above lamination of further layer, heat sealing character, strength, slipping character, antistatic properties, printing character, light-shielding character or a fine view may further be improved.

The film of the invention is suitable for packaging silver halide photographic materials for photographic purpose, diazo photographic materials, photosensitive resins, self-developing type photographic materials, diffusion-transfer type photographic materials and other photographic materials which is degraded by moisture or a gas.

Package form may be usual, and includes a single-sheet flat bag, a double-sheet flat bag, a square bottom bag, a self-standing bag, a single-sheet gusset bag, a double-sheets gusset bag, a film sheet, inner lining for a moisture proof box and a leader paper. The sealing form may also be usual, and includes heat sealing, impulse heat sealing, supersonic welding and hgih frequency sealing. The methods of using an adhesive and a pressure sensitive adhesive may also be utilized.

The film of the invention is superior in physical strength, such as tear strength, impact puncture strength, flexibility, heat sealing strength, hot tack strength, slipping character, Gelbo test strength and dropping strength, moisture proofing, gas barrier, light-shielding and antistatic character, and it is superior as a packaging film for a photosensitive material for photographic purpose. This film is superior not only in the functions of protecting inner materials but also in the packaging process which is made simple and sure. Production of this film easy, and its cost is low.

EXAMPLES

Figure 1:
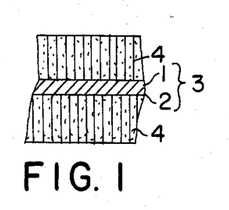
FIGS. 1–4 illustrate partial sectional views of laminated films which are various embodiments of the invention.

FIG. 1 is a partial sectional view of a laminated film which is an example of the invention. This laminated film consists of a metallized film layer 3 consisting of a thermoplastic resin film 1 and a metallic membrane 2 formed on one face of the thermoplastic resin film 1, and two light-shielding L-LDPE layers 4, 4 directly laminated to both faces of the metallized film layer 3.

Figure 2:
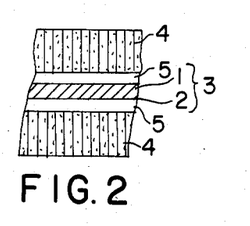

FIG. 2 is a partial sectional view of a laminated film which is another example of the invention. This film consists of a metallized film layer 3 consisting of a thermoplastic resin film 1 and a metalic membrane 2 formed on one face of the thermoplastic resin film 1, and two light-shielding L-LDPE layers 4, 4 laminated to both faces of the metallized film layer 3 each through an adhesive layer 5.

Figure 3:
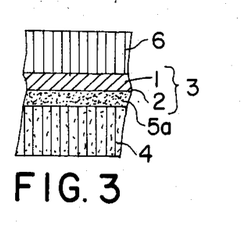

FIG. 3 is a partial sectional view of a laminated film which is another example of the invention. This film consists of a metallized film layer 3 consisting of a thermoplastic resin film 1 and a metallic membrane 2 formed on one face of the thermpolastic resin film 1, a light-shielding L-LDPE layer 4 laminated to the face of metalic membrane 2 side of the metallized film layer 3 through an adhesive layer 5a containing a light-shielding material, and a L-LDPE polyethylene polymer layer 6 directly laminated to the other face of the metallized film layer 3.

Figure 4:
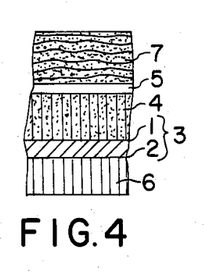

FIG. 4 is a partial sectional view of a laminated film which is another example of the invention. This film consists of a metallized film layer 3 consisting of a thermoplastic resin film 1 and a metalic membrane 2 formed on one face of the thermoplastic resin film 1, a L-LDPE polyethylene polymer layer 6 directly laminated to the face of metalic membrane 2 side of the metallized film layer 3, a light-shielding L-LDPE layer 4 directly laminated to the other face of the metallized film layer 3, and a flexible sheet layer 7 containing a light-shielding material laminated to its outer side through an adhesive layer 5.

Figure 5:
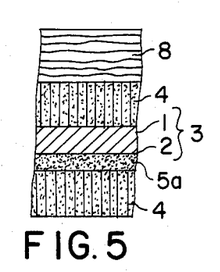
FIGS. 5–7 illustrate partial sectional side views of laminated films according to embodiments of the invention.

FIG. 5 is a partial sectional side view of a laminated film which is another example of the invention. This film consists of a metallized film layer 3 consisting of a thermoplastic resin film 1 and a metalic membrane 2 formed on its one face, a light-shielding L-LDPE layer 4 laminated to the face of metalic membrane 2 side through an adhesive layer 5a containing a light-shielding material, a light-shielding L-LDPE layer 4 directly laminated to the other face, and a flexible sheet layer 8 not containing a light-shielding material and directly laminated to its outer side.

Figure 6:
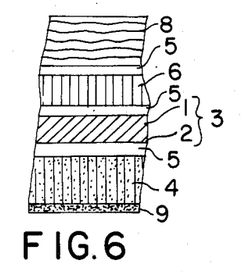

FIG. 6 is a partial sectional side view of a laminated film which is another example of the invention. This film consists of a metallized film layer 3 consisting of a thermoplastic resin film 1 and a metalic membrane 2 formed on one face, a light-shield L-LDPE layer 4 laminated to the face of metalic membrane 2 side through an adhesive layer 5, a heat sealing layer 9 directly laminated to its outer side, a L-LDPE polyethylene polymer layer 6 laminated to the other side of the thermoplastic resin layer 1 through an adhesive layer 5, and a flexible sheet layer 8 not containing a light-shielding material and laminated to its outer side through an adhesive layer 5.

Figure 7:
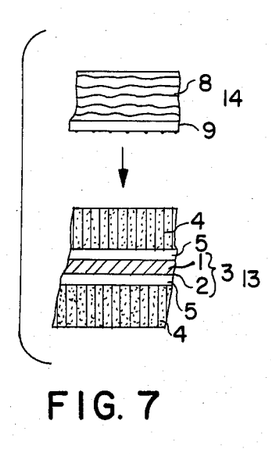

FIG. 7 is a partial sectional side view of a laminated film which is another example of the invention. This film is a representative example for the bag having a double laminate films construction such as a double-sheet flat bag and a double-sheet gusset bag. This film consists of an inner sheet 13 which consists of a metallized film layer 3 consisting of a thermoplastic resin film 1 and a metalic membrane 2 formed on its one face, and two light-shielding L-LDPE layers 4, 4 laminated to its both sides each through an adhesive layer 5, and an outer sheet 14 which consists of a flexible sheet layer 8 not containing a light-shielding material and a heat sealing layer 9 laminated to it.

Various properties of a part of these examples of which the layer constructions are shown in Table 1 were measured, and the results are shown in Table 2.

As the materials employed, L-LDPE of the layer laminated through an adhesive layer was "ULTZEX 2020L" (MI 2.5 g/10 minutes, density 0.922 g/cm$^3$, manufactured by Mitsui Petrochemical Industries Co., Ltd.), L-LDPE of the layer directly laminated was "ULTZEX 2080C" (MI 8 g/10 minutes, density 0.920 g/cm$^3$, manufactured by Mitsui Petrochemical Industries Co., Ltd.), LDPE was "DFD-0111" (MI 2.4 g/10 minutes, density 0.923 g/cm$^3$, manufactured by Nippon Unicar Co., Ltd.), the adhesive layer was "MIRASON 14" (MI 5.1 g/10 minutes, density 0.919 g/cm$^3$, manufactured by Mitsui Polychemicals Co., Ltd.), the heat sealing layer was "MIRASON 15" (MI 4.0 g/10 minutes, density 0.917 g/cm$^3$, manufactured by Mitsui Polychemicals Co., Ltd.), and carbon black was "#44B oil furnace black" (mean particle size 21 m$\mu$, pH 7.7, manufactured by Mitsubishi Chemical Industries Ltd.).

Melt index (MI) was measured according to JIS K 6760 (ASTM 1238).

As to some comparative examples and some conventional examples of which the layer constructions are shown in Table 3, the same properties were measured, and the results are shown in Table 4. Layer constitutions of the comparative examples are shown in FIGS. 8-11, and those of the conventional examples are shown in FIGS. 12-13. One of the conventional examples had the layer constitution of FIG. 2 where the light-shielding L-LDPE layers 4, 4 were replaced by LDPE layers containing the light-shielding material. In these drawings, 17 represents aluminum foil.

TABLE 1

| Film No. | 1 | 2 | 3 | 4 | 5 | 6 | 7 | 8 | 9 | |
|---|---|---|---|---|---|---|---|---|---|---|
| L-LDPE (wt %) | 89.5 | 89.5 | 89.5 | 89.5 | 89.5 | 89.5 | 89.5 | 89.5 | 79 | 85 |
| LDPE (wt %) | 7.5 | 7.5 | 7.5 | 7.5 | 7.5 | 7.5 | 7.5 | 7.5 | 15 | 15 |
| CB (wt %) | 3 | 3 | 3 | 3 | 3 | 3* | 3 | 3 | 6 | 0 |
| Thickness of PE (inner side) ($\mu$m) | 50 | 70 | 50 | 50 | 50 | 50 | 50 | 50 | 50 | — |
| Thickness of PE (outer side) ($\mu$m) | 50 | 50 | 50 | 50 | 50 | 50 | 50 | 50 | — | 50 |
| MFL TRF ($\mu$m) | BONY | CPP | CPP | OPP | BONY | BO PET | BO HDPE | UO L-LDPE | CPP | |
| | 20 | 20 | 20 | 20 | 20 | 12 | 25 | 20 | 20 | |
| NM (Å) | Al | " | " | " | " | " | " | " | " | |
| | 400 | " | " | " | " | " | " | " | " | |
| Adhesive Layer | — | LDPE | " | " | " | " | " | " | EEA WITH CB | |
| ($\mu$m) | — | 15 × 2 | " | " | " | " | " | " | " | |
| Layer constitution | FIG. 1 | FIG. 2 | " | " | " | " | " | " | FIG. 3 | |
| Total Thickness ($\mu$m) | 118 | 165 | 146 | 148 | 148 | 141 | 152 | 146 | 136 | |
| Difference of | 0 | 20 | 0 | 0 | 0 | 0 | 0 | 0 | 25 | |

TABLE 1-continued

| Film No. | 1 | 2 | 3 | 4 | 5 | 6 | 7 | 8 | 9 |
|---|---|---|---|---|---|---|---|---|---|
| both PE (%) | | | | | | | | | |

PE: Polyethylene Polymer Layer containing L-LDPE
*Aluminum Paste
TRF: Thermoplastic Resin Film
BO: Biaxial Oriented
NY: Nylon
OPP: Biaxial Oriented Polypropylene
CB: Carbon Black
MFL: Metallized Film Layer
MM: Metalic Membrane
UO: Uniaxial Oriented
CPP: Non Oriented Polypropylene
PET: Polyester

TABLE 2

| Film No. | 1 | 2 | 3 | 4 | 5 | 6 | 7 | 8 | 9 |
|---|---|---|---|---|---|---|---|---|---|
| TS (l) (g) | 528 | 1260 | 1019 | 508 | 586 | 423 | 683 | 1130 | 1138 |
| TS (h) (g) | 1263 | >1600 | >1600 | 826 | 1450 | 586 | 1310 | >1600 | >1600 |
| IP (kg · cm) | 21 | 29 | 27 | 18 | 23 | 19 | 22 | 26 | 28 |
| MP (g/m² · 24 hr) | ◎ | ◎ | ◎ | ◎ | ◎ | ◎ | ◎ | ◎ | ◎ |
| L-S | ◎ | ◎ | ◎ | ◎ | ◎ | ◎ | ◎ | ◎ | ◎ |
| FE (V) | O | O | O | O | O | O | O | O | O |
| HT | ◎ | ◎ | ◎ | ◎ | ◎ | ◎ | ◎ | ◎ | ◎ |

TS: Tear Strength
l: Longitudinal Direction
h: Horizontal Direction
IP: Impact Puncture Strength
MP: Moisture Proofing
L-S: Light-Shielding Character
FE: Frictional Electrification
HT: Hot Tack Properties

TABLE 3

Figure 8:
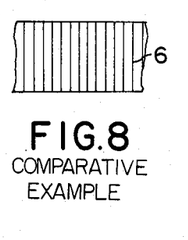
FIGS. 8–11 are layer constitutions of comparative examples.
Figure 9:
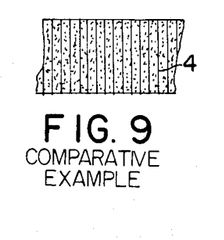
Figure 10:
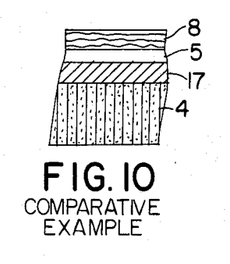
Figure 11:
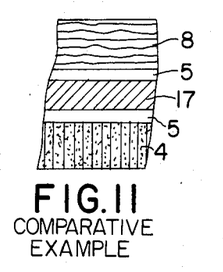
Figure 12:
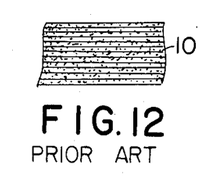
FIGS. 12–13 are prior art examples.

| | Comparative | | | | Conventional | | | |
|---|---|---|---|---|---|---|---|---|
| Film No. | C1 | C2 | C3 | C4 | R1 | R2 | R3 | R4 |
| L-LDPE (wt %) | 100 | 79 | 79 | 79 | 0 | 0 | 0 | 0 |
| LDPE (wt %) | 0 | 15 | 15 | 15 | 97 | 97 | 97 | 97 |
| CB (wt %) | 0 | 6 | 6 | 6 | 3 | 3 | 3 | 3 |
| Thickness of PE (inner side) (μm) | 50 | 50 | 70 | 50 | — | — | — | — |
| Thickness of LDPE | — | — | — | — | 70 | 70 | 50 | 50 × 2 |
| FS | — | — | KP | KP | — | KP | KP | — |
| (μm) | | | 43 | 43 | | 43 | 43 | |
| Aluminum Foil | — | — | AF | AF | — | AF | AF | AF |
| (μm) | | | 7 | 7 | | 7 | 7 | 7 |
| Adhesive Layer | — | — | LDPE | LDPE | — | LDPE | LDPE | LDPE |
| (μm) | | | 15 × 1 | 15 × 2 | | 15 × 2 | 15 × 2 | 15 × 2 |
| Layer constitution | FIG. 8 | FIG. 9 | FIG. 10 | FIG. 11 | FIG. 12 | FIG. 13 | FIG. 13 + LDPE Layer | FIG. 2 7 → 2 |
| Total Thickness | 50 | 50 | 138 | 134 | 70 | 158 | 195 | 138 |

PE: Polyethylene Polymer Layer containing L-LDPE
FS: Flexible Sheet
KP: 35 g Bleached Kraft Paper
AF: Aluminum Foil

TABLE 4

| | Comparative | | | | Conventional | | | |
|---|---|---|---|---|---|---|---|---|
| Film No. | C1 | C2 | C3 | C4 | R1 | R2 | R3 | R4 |
| TS (l) (g) | 610 | 794 | 326 | 393 | 100 | 212 | 294 | 86 |
| TS (h) (g) | 817 | 951 | 354 | 374 | 312 | 157 | 610 | 234 |
| IP (kg · cm) | 9.3 | 10.8 | 7.6 | 8.8 | 3.8 | 4.6 | 5.1 | 8.6 |
| MP (g/m² · 24 hr) | x | x | ◎ | ◎ | x | ◎ | ◎ | ◎ |
| L-S | x | ● | O | O | ●~O | O | ◎ | ◎ |
| FE (V) | x | x | O | O | x | O | O | O |
| HT | O | O | ◎ | ◎ | ▲ | ▲ | ▲ | ▲ |

Evaluations in Tables 2 and 4 were as follows;
◎ very excellent
● practical
x impractical
O excellent
▲ having a problem Testing methods were as follows;
Thickness; JIS P 8118
Tear Strength; JIS P 8116
Impact Puncture Strength; JIS P 8134
Moisture Proofing; JIS Z 0208-1976 (40° C., 90%, g/m² 24 hr)

Light-Shielding Character

A photographic film of ASA 100 was put into the bag made by each exemplified film, and then the bag was completely sealed. This bag was exposed to the light of 80,000 luxes for one hour, and the light-shielding character was estimated by the fogging degree of the photographic film.

Frictional Electrification

An endless belt of each exemplified film having 35 mm in width and 1350 mm in length was prepared, this belt was run between two SUS rollers loaded with 500 g at a speed of 12 m/min. The frictional electrification was measured by a voltmeter.

Hot Tack Properties

Two sheets of each exemplified film having 15 mm in width was sealed by heat sealing, and just after, the open ends were pulled by the weight of 45 g at the releasing angle of 22.5 degree. This character was estimated by the released length (cm).

Figure 14:
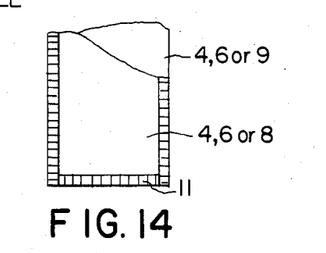
FIG. 14 is a plan view of a single-sheet flat bag made of the film of the invention.
Figure 15:
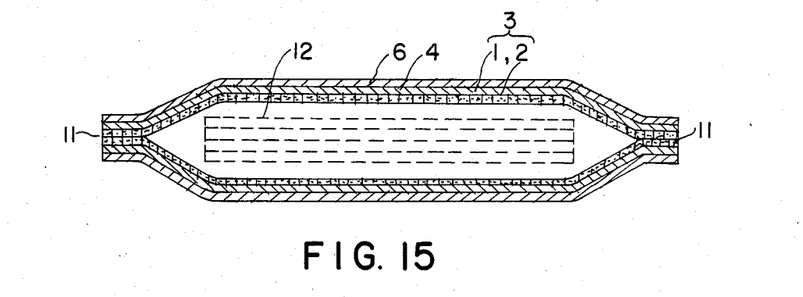
FIG. 15 is a sectional side view of FIG. 14.

FIG. 14 is a plan view of a single-sheet flat bag made of the film of the invention, and FIG. 15 is a sectional side view thereof. Whole edge of this bag was sealed 11. 12 indicates a photosensitive material.

Figure 16:
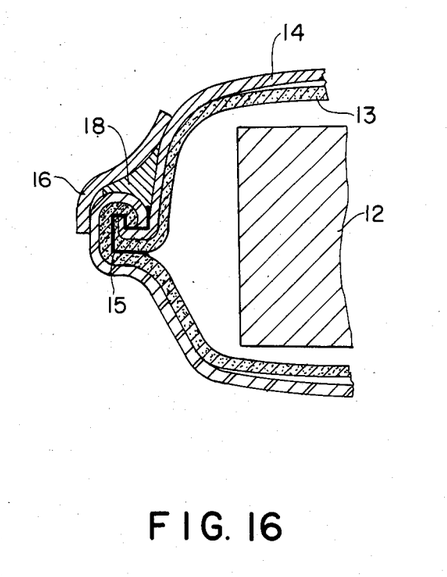
FIG. 16 is a partial sectional side view of a double-sheet gusset bag made of the film of the invention.

FIG. 16 is a partially sectional side view of a double-sheets gusset bag made of the film of the invention. This bag consisted of the film shown in FIG. 7. The inner sheet 13 and the outer sheet 14 were sealed at a center sealing of its longitudinal direction (not shown in the drawing) and an edge sealing position 15 by heat sealing. The edge was tacked and joined by an adhesive 18. A tape 16 was further added to form a seal.

I claim:

1. A film for packaging a photosensitive material which is a laminated film containing at least a metallized film layer and two polyethylene polymer layers which are located on both sides of said metallized film layer,
   (a) at least one of said polyethylene polymer layers contains more than 50 wt% of linear low density polyethylene manufactured by a low pressure method,
   (b) at least one of the polyethylene polymer layers contains 0.3 to 30 wt% of a light-shielding material, and
   (c) the strength of at least one of the polyethylene polymer layers is stronger than the adhesive force between the polyethylene polymer layer and said metallized film layer and the difference in the thickness of the polyethylene polymer layers is less than 50%.

2. The film of claim 1, wherein said metal is aluminum.

3. The film of claim 1, wherein said polyethylene polymer layer contains low density polyethylene manufactured by high pressure method.

4. The film of claim 1, wherein said light-shielding material is carbon black.

5. The film of claim 1, wherein said metallized film layer is a thermoplastic resin film at least one surface of which is coated with a metal by vacuum evaporation, and said thermoplastic resin comprises at least one resin selected from the group consisting of polypropylene, high density polyethylene manufactured by a low pressure method, medium density polyethylene manufactured by a low pressure method, low density polyethylene manufactured by a high pressure method, linear low density polyethylene manufactured by a low pressure method, and a polyamide.

6. The film of claim 5, wherein said thermoplastic resin is non oriented polypropylene.

7. The film of claim 5, wherein said metal is aluminum.

8. The film of claim 1, wherein a comonomer of said linear low density polyethylene manufactured by a low pressure method is an α-olefin having a carbon number of 3 to 13.

9. The film of claim 8, wherein said comonomer coprises at least one monomer selected from the group consisting of 4-methylpentene-1 and hexene-1.

* * * * *